United States Patent

Ito

Patent Number: 5,179,296
Date of Patent: Jan. 12, 1993

[54] CHARGE PUMP SUBSTRATE BIAS CIRCUIT

[75] Inventor: Nobuhiko Ito, Tenri, Japan

[73] Assignee: Sharp Kabushiki Kaisha, Osaka, Japan

[21] Appl. No.: 887,483

[22] Filed: May 21, 1992

[30] Foreign Application Priority Data

Jun. 21, 1991 [JP] Japan .................. 3-150550

[51] Int. Cl.$^5$ ............... H03K 3/01; H03K 17/687
[52] U.S. Cl. ................. 307/296.2; 307/296.6; 307/578; 307/583; 307/585; 307/264; 307/607
[58] Field of Search ............... 307/296.2, 296.6, 482, 307/578, 582, 583, 585, 264, 607

[56] References Cited

U.S. PATENT DOCUMENTS 5,023,465  6/1991  Douglas et al. ............. 307/296.2

FOREIGN PATENT DOCUMENTS 3-19357  1/1991  Japan .
2149251  6/1985  United Kingdom ............ 307/296.2

Primary Examiner—William L. Sikes
Assistant Examiner—Margaret R. Wambach
Attorney, Agent, or Firm—Morrison & Foerster

[57] ABSTRACT

A charge pump circuit having a pumping capacitor is provided. A first terminal of the pumping capacitor is connected to a $V_{CC}$ power source through a P-MOS transistor, and grounded via an N-MOS transistor. The gates of these transistors receive a signal in which the HIGH level and the LOW level are alternately repeated. A second terminal of the pumping capacitor is grounded via an N-MOS transistor. The gate of the N-MOS transistor is connected to a terminal through a capacitor, and also to the second terminal of the pumping capacitor via an N-MOS transistor the gate of which is grounded. The second terminal is connected to an external circuit through an N-MOS transistor. The gate of the N-MOS transistor is connected to a terminal through a capacitor, and also to the output terminal through an N-MOS transistor the gate of which is connected to the node.

3 Claims, 1 Drawing Sheet

CHARGE PUMP SUBSTRATE BIAS CIRCUIT

BACKGROUND OF THE INVENTION

1. Field of the Invention

This invention relates to a charge pump circuit for generating a voltage $V_{BB}$ for a semiconductor memory device.

2. Description of the Prior Art

A charge pump circuit such as shown in FIG. 2 is used as a $V_{BB}$ power source for supplying a voltage $V_{BB}$ to a semiconductor substrate of a semiconductor memory device. The charge pump circuit serves to pump electric charges from the semiconductor substrate to the ground so as to set the potential of the semiconductor substrate at a level under the ground potential level.

In this charge pump circuit, first a terminal 11 is set to active (LOW level) so that a P-MOS transistor $Q_{11}$ is turned on, and consequently the potential of node 13 increases to the $V_{CC}$ level due to the coupling effect of a pumping capacitor $C_{11}$. As a result, an N-MOS transistor $Q_{13}$ is turned on, and consequently the potential of the node 13 decreases to the ground level. Accordingly, the pumping capacitor $C_{11}$ is charged by the $V_{CC}$ power source.

Then, the terminal 11 is returned to HIGH level and a terminal 12 is set to active (HIGH level) so that an N-MOS transistor $Q_{12}$ is turned on. This causes the potential of the first terminal of the pumping capacitor $C_{11}$ to switch from the $V_{CC}$ level to the GND level, whereby the node 13 corresponding to the other terminal of the pumping capacitor $C_{11}$ is pulled down to a level lower than the GND level by the coupling effect of the capacitor $C_{11}$. Accordingly, the N-MOS transistor $Q_{13}$ is turned off, and an N-MOS transistor $Q_{14}$ is turned on, thereby supplying the voltage $V_{BB}$ to a semiconductor substrate of a semiconductor memory device. In other words, the charge pump circuit absorbs the electric charges from the substrate so that the potential of the substrate is reduced to the $V_{BB}$ level.

In the above prior art circuit, when the P-MOS transistor $Q_{11}$ is turned on, a decrease in the potential level of the node 13 after the activation of the N-MOS transistor $Q_{13}$ causes the N-MOS transistor $Q_{13}$ to turn off. As a result, the potential level of the node 13 cannot decrease to a level less than the threshold voltage $V_{th}$ of the transistor $Q_{13}$. Therefore, the charging level of the pumping capacitor $C_{11}$ cannot reach the level of the $V_{CC}$ power source, and is lower than this level by about the threshold voltage $V_{th}$.

In contrast, when the N-MOS transistor $Q_{12}$ is turned on, the N-MOS transistor $Q_{14}$ remains in the on state as long as the level of the node 13 is lower than the voltage $V_{BB}$ by about the threshold voltage $V_{th}$ of the N-MOS transistor $Q_{14}$. Therefore, even when the level of the node 13 is pulled down to the level of $(-V_{CC}+V_{th})$, the resulting value of the voltage $V_{BB}$ is higher than this level by about the threshold voltage $V_{th}$.

As a result, in such a prior art circuit, there is a problem in that the voltage generated as the voltage $V_{BB}$ is at a level of about $(-V_{CC}+2 \times V_{th})$ and cannot reach a sufficiently low level, particularly when the voltage of the $V_{CC}$ power source is low.

SUMMARY OF THE INVENTION

The charge pump circuit of this invention, comprises an output terminal for being connected to an external circuit; a capacitor having first and second terminals, the second terminal being connected the output terminal; a voltage supplying means for supplying a first voltage and a second voltage alternatively to the first terminal of the capacitor, the first voltage being higher than the second voltage; a first switching means for grounding the second terminal of the capacitor when the first switching means is turned on, the first switching means connected between the second terminal of the capacitor and the ground; a first driving means for turning on the first switching means when the voltage supplying means supplies the first voltage to the first terminal of the capacitor; a second switching means for electrically connecting the second terminal of the capacitor to the output terminal when the second switching means is turned on, the second switching means connected between the second terminal of the capacitor and the output terminal; and a second driving means for turning on the second switching means when the voltage supplying means supplies the second voltage to the first terminal of the capacitor.

In a preferred embodiment, the voltage supplying means comprises: a first voltage generating means for generating the first voltage; second voltage generating means for generating the second voltage; a first transistor connected between the first terminal of the capacitor and the first voltage generating means, the first transistor supplying the first voltage from the first voltage generating means to the first terminal of the capacitor when the first transistor is turned on; and a second transistor connected between the first terminal of the capacitor and the second voltage generating means, the second transistor supplying the second voltage from the second voltage generating means to the first terminal of the capacitor when the second transistor is turned on.

In a preferred embodiment, the second voltage is the ground voltage.

Thus, the invention described herein makes possible the objectives of (1) providing a charge pump circuit in which a driving circuit for forcibly turning on transistors for charging a pumping capacitor and supplying the power is provided, and (2) providing a charge pump circuit for supplying a voltage $V_{BB}$ of a sufficiently low level.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
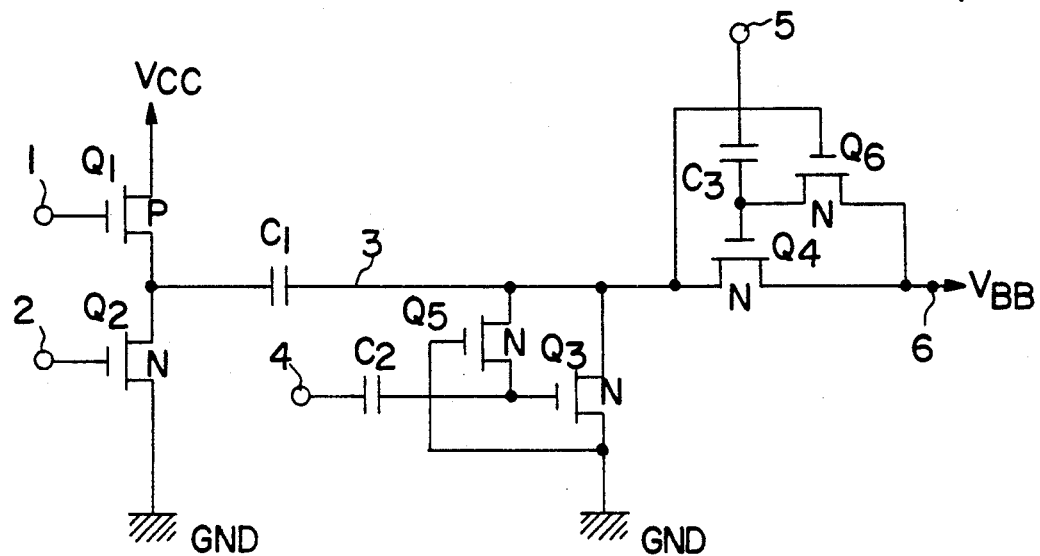
FIG. 1 is a circuit diagram of a charge pump circuit according to the present invention.
Figure 2:
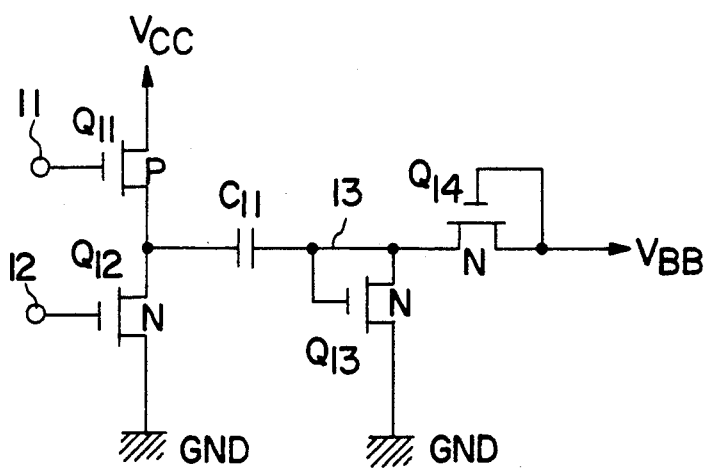
FIG. 2 is a circuit diagram of a prior art charge pump circuit.

FIG. 1 shows a charge pump circuit according to the present invention. The charge pump circuit comprises a pumping capacitor $C_1$. A first terminal of the pumping capacitor $C_1$ is connected to a $V_{CC}$ power source through a P-MOS transistor (a first transistor) $Q_1$, and grounded via an N-MOS transistor (a second transistor) $Q_2$. The gates of these transistors $Q_1$ and $Q_2$ are respectively coupled to an oscillation circuit (not shown) through terminals 1 and 2, so as to receive a signal in which the HIGH level and the LOW level are alternately repeated.

A node 3 of a second terminal of the pumping capacitor $C_1$ is grounded via an N-MOS transistor (a first switching transistor) $Q_3$. The gate of the N-MOS transistor $Q_3$ is connected to a terminal 4 through a capacitor $C_2$, and also to the node 3 via an N-MOS transistor $Q_5$ the gate of which is grounded.

As a $V_{BB}$ power source, the node 3 is connected to an external circuit through an N-MOS transistor $Q_4$ and an output terminal 6. The gate of the N-MOS transistor $Q_4$ is connected to a terminal 5 through a capacitor $C_3$, and also to the output terminal 6 through an N-MOS transistor $Q_6$ the gate of which is connected to the node 3.

The operation of the thus configured charge pump circuit will be described.

First, when the terminal 1 is set to active (LOW level), the P-MOS transistor $Q_1$ is turned on. In this stage, since the gate of the transistor $Q_5$ is grounded, the potential of the gate of the transistor $Q_3$ is about $-V_{th}$. Thereafter, the terminal 4 is set to active (HIGH level) so that the potential of the gate of the transistor $Q_3$ is raised through the capacitor $C_2$ to a level more than the threshold voltage $V_{th}$, thereby turning on the transistor $Q_3$. Then, the potential of the node 3 is grounded, and the pumping capacitor $C_1$ is charged by the $V_{CC}$ power source. Since the on state of the transistor $Q_3$ is maintained even when the potential of the node 3 reaches the ground level, the pumping capacitor $C_1$ is sufficiently charged to the level of $V_{CC}$.

When the terminal 1 is returned to HIGH level and the terminal 2 is set to active (HIGH level), the transistor $Q_2$ is turned on, and the potential of the first terminal of the pumping capacitor $C_1$ is switched from the level of $V_{CC}$ to the GND level, whereby the potential of the node 3 which is at the side of the second terminal is pulled down to the level of $-V_{CC}$. At this time, because of the potential drop of the node 3, the transistor $Q_6$ is turned off. When the terminal 5 is set to active (HIGH level) under this condition, the potential of the gate of the transistor $Q_4$ is raised through the capacitor $C_3$ to that more than the threshold voltage $V_{th}$, thereby turning on the transistor $Q_4$. Since this potential drop of the node 3 causes the transistor $Q_5$ to turn on, the capacitor $C_2$ is discharged, with the result that the transistor $Q_3$ is turned off. Then, the pulled down potential of the node 3 (the second terminal of the pumping capacitor $C_1$) is supplied to the external circuit as the voltage $V_{BB}$. In this case, furthermore, the on state of the transistor $Q_4$ is maintained by the capacitor $C_3$, and hence the potential of the level of $-V_{CC}$ of the node 3 becomes exactly the same as the $V_{BB}$ power source.

When the terminal 1 becomes active again after the above operation, the potential rise of the node 3 causes the transistor $Q_6$ to turn on so that the capacitor $C_3$ is discharged and the transistor $Q_4$ is turned off. Therefore, it becomes possible again to charge the pumping capacitor $C_1$.

As a result, the phenomenon that, in order to maintain the on state of the transistors $Q_3$ and $Q_4$, the voltage $V_{BB}$ is raised by their threshold voltage $V_{th}$ is prevented from occurring, and therefore it is possible to surely supply a voltage of the level of $-V_{CC}$.

As seen from the above description, according to the charge pump circuit of the present invention, the phenomenon of raising the voltage $V_{BB}$ by the threshold voltage $V_{th}$ is prevented, and therefore it becomes possible to generate the voltage $V_{BB}$ of a sufficiently low level even when the voltage of the $V_{CC}$ power source is low.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A charge pump circuit comprising:
   an output terminal for being connected to an external circuit;
   a capacitor having first and second terminals, said second terminal being connected to said output terminal;
   a voltage supplying means for supplying a first voltage and a second voltage alternately to said first terminal of said capacitor, said first voltage being higher than said second voltage;
   a first switching means for grounding said second terminal of said capacitor when said first switching means is turned on, said first switching means connected between said second terminal of said capacitor and the ground;
   a first driving means for turning on said first switching means when said voltage supplying means supplies said first voltage to said first terminal of said capacitor;
   a second switching means for electrically connecting said second terminal of said capacitor to said output terminal when said second switching means is turned on, said second switching means connected between said second terminal of said capacitor and said output terminal; and
   a second driving means for turning on said second switching means when said voltage supplying means supplies said second voltage to said first terminal of said capacitor.

2. A charge pump circuit according to claim 1, wherein said voltage supplying means comprises:
   a first voltage generating means for generating said first voltage;
   a second voltage generating means for generating said second voltage;
   a first transistor connected between said first terminal of said capacitor and said first voltage generating means, said first transistor supplying said first voltage from said first voltage generating means to said first terminal of said capacitor when said first transistor is turned on; and
   a second transistor connected between said first terminal of said capacitor and said second voltage generating means, said second transistor supplying said second voltage from said second voltage generating means to said first terminal of said capacitor when said second transistor is turned on.

3. A charge pump circuit according to claim 1, wherein said second voltage is the ground voltage.

* * * * *